July 31, 1962 R. E. SCHWARTZ 3,047,105
FRICTION DEVICE
Filed Oct. 28, 1959 4 Sheets-Sheet 1

INVENTOR
ROBERT E. SCHWARTZ
By Gravely, Lieder & Woodruff
ATTORNEYS.

July 31, 1962  R. E. SCHWARTZ  3,047,105
FRICTION DEVICE
Filed Oct. 28, 1959  4 Sheets-Sheet 2

INVENTOR:
ROBERT E. SCHWARTZ
By Gravely, Lieder & Woodruff
ATTORNEYS.

INVENTOR:
ROBERT E SCHWARTZ
By Gravely, Lieder & Woodruff
ATTORNEYS

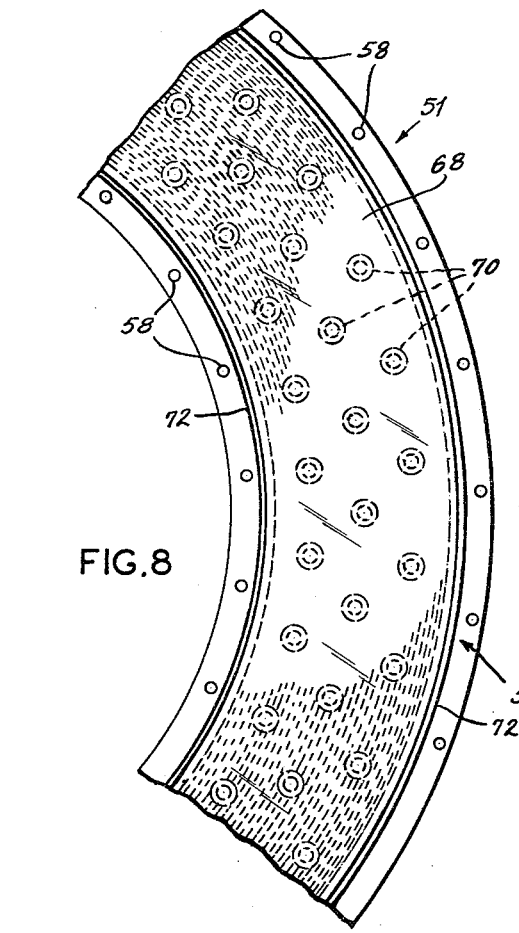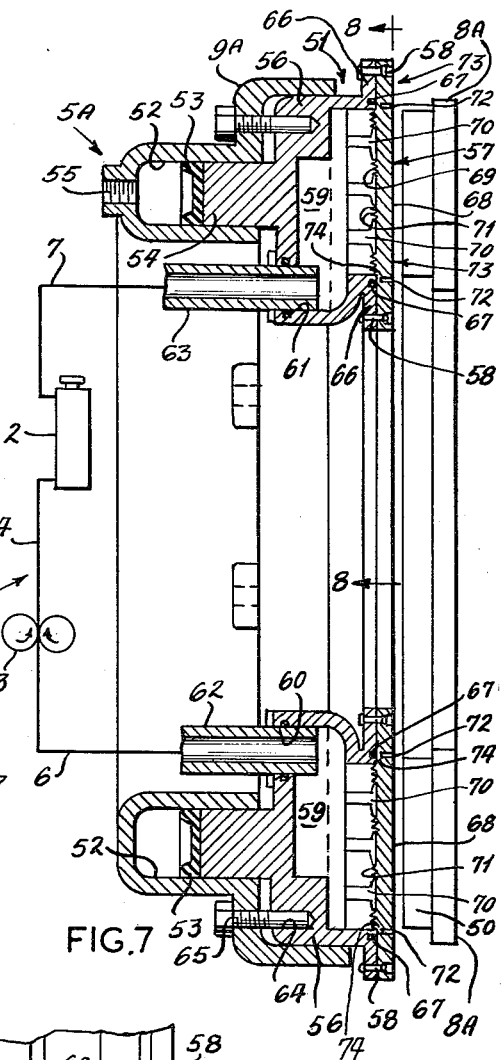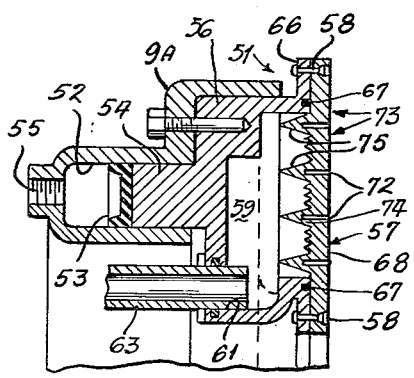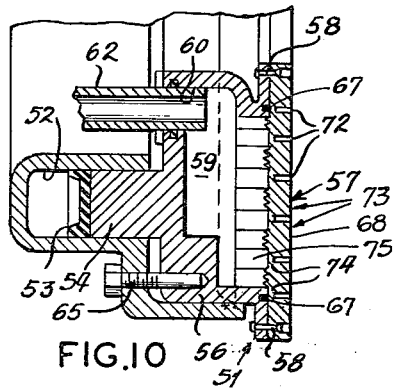

000000000000000000000000000000000000000000000000000000000000000000000000000000000000000000000000000000000000000000000000000000000000000000000000000000000000000000
United States Patent Office 3,047,105
Patented July 31, 1962

3,047,105
FRICTION DEVICE
Robert E. Schwartz, University City, Mo., assignor to Wagner Electric Corporation, St. Louis, Mo., a corporation of Delaware
Filed Oct. 28, 1959, Ser. No. 849,191
9 Claims. (Cl. 188—264)

This invention relates to friction devices and in particular to a fluid cooled friction member therein.

In the past it has been attempted to cool friction devices by circulating a fluid through a friction member on one side of a metallic friction element so that the intense heat generated during frictional engagement of the friction element with a cooperating friction drum was transferred through the friction element to the cooling fluid. The primary undesirable feature of this type of friction member was that the extreme heat and pressure generated during frictional engagement distorted the metallic friction element so that the friction surface thereof became permanently buckled thereby causing non-uniform frictional engagement with the cooperating friction drum reducing the effectiveness of the friction device and effecting excessive wear and localized overheating of said metallic friction element. Another undesirable feature was that the permanent distortion of the metallic friction element affected the seals employed in the friction member effecting leakage of cooling fluid therefrom.

An object of the present invention is to provide a fluid cooled friction device which overcomes the above described undesirable features.

Another object of the present invention is to provide a fluid cooled friction member with a relatively thin, metallic, friction element having means to substantially maintain the predetermined symmetry of said friction element during and after frictional engagement.

Still another object of the present invention is to provide a fluid cooled friction member with a relatively thin, metallic, friction element having means to absorb deformation thereof due to intense frictional engagement.

These and other objects and advantages of the present invention will become apparent hereinafter.

Figures 1, 3:
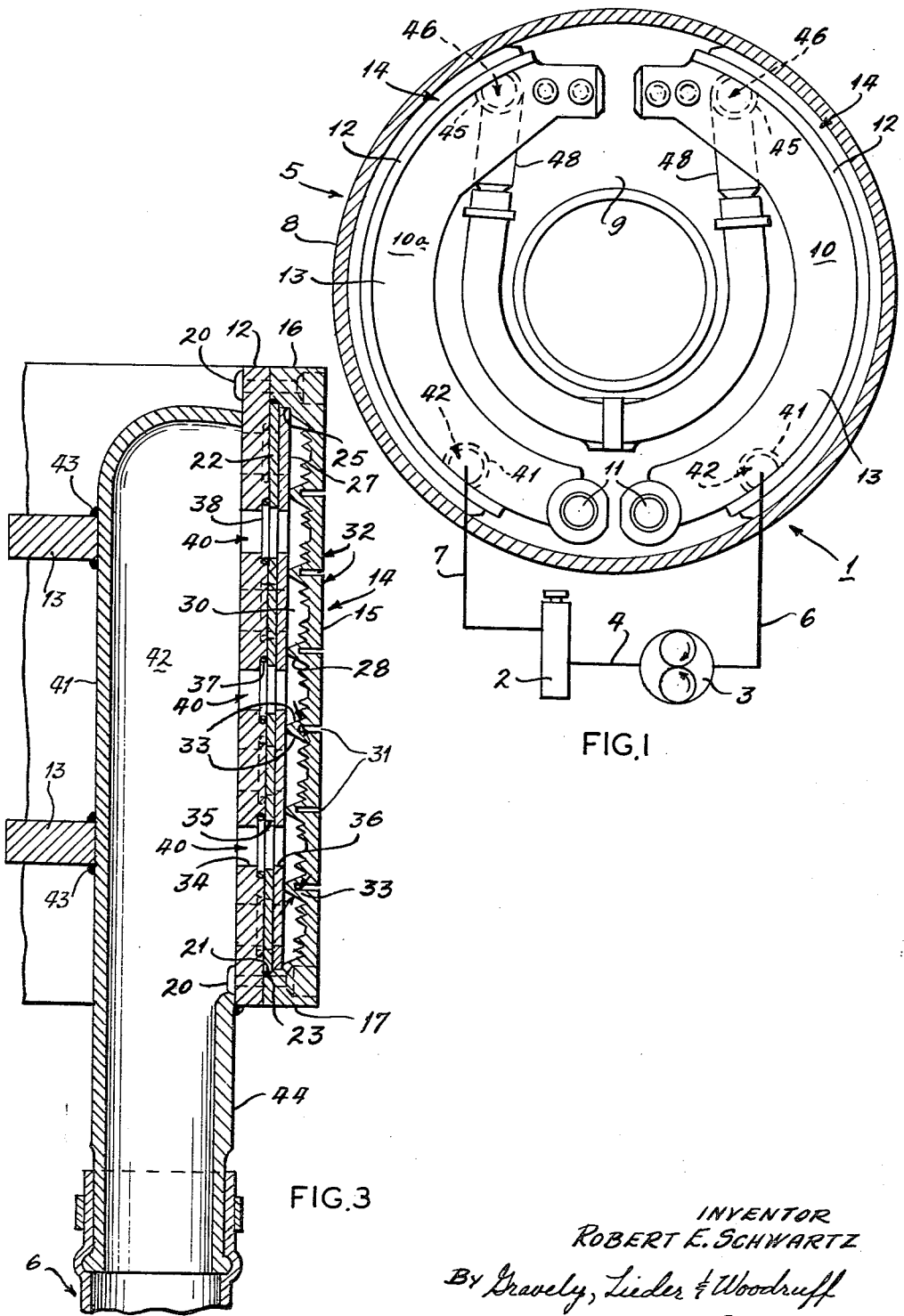
Figure 2:
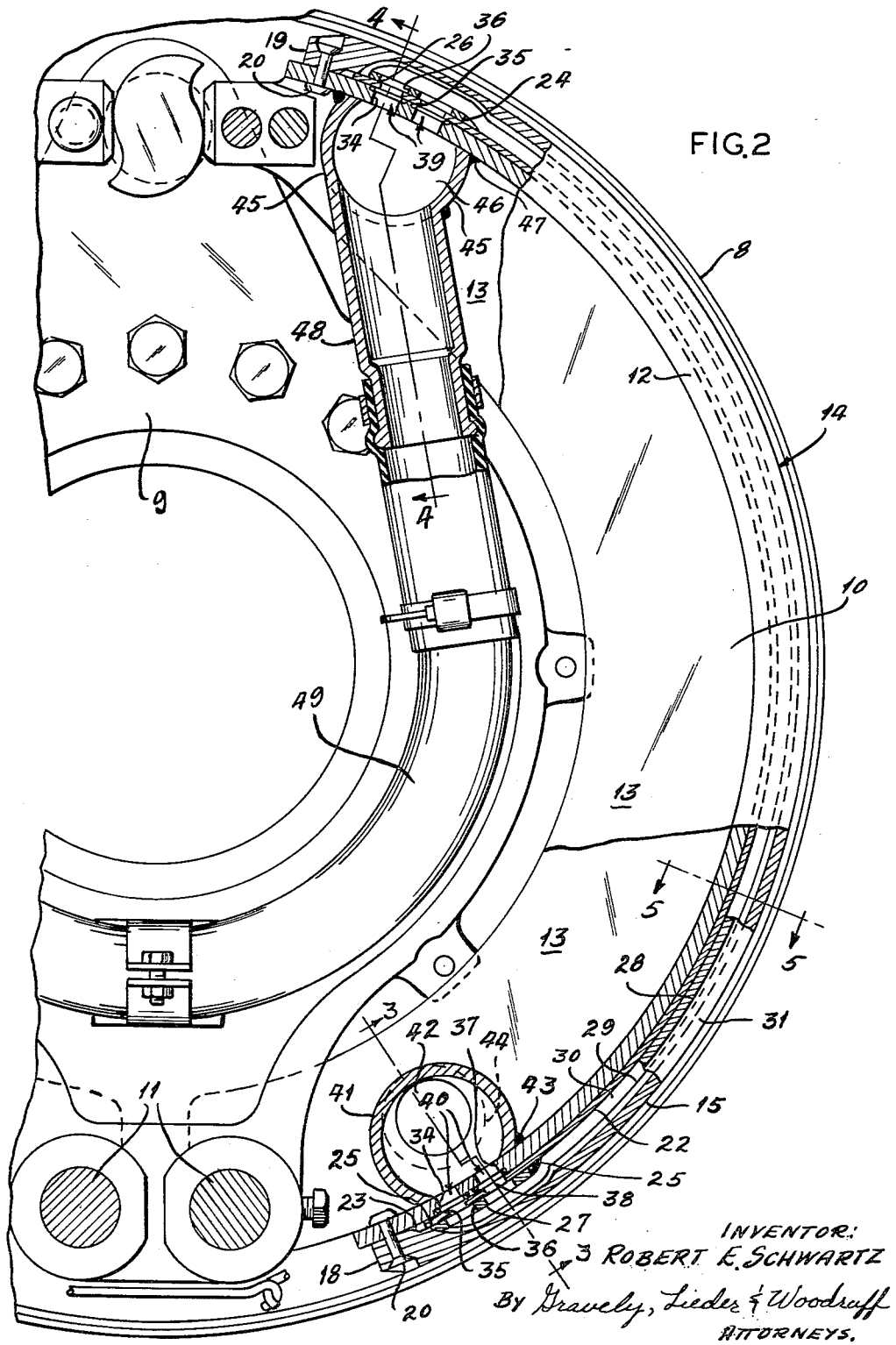
Figure 4:
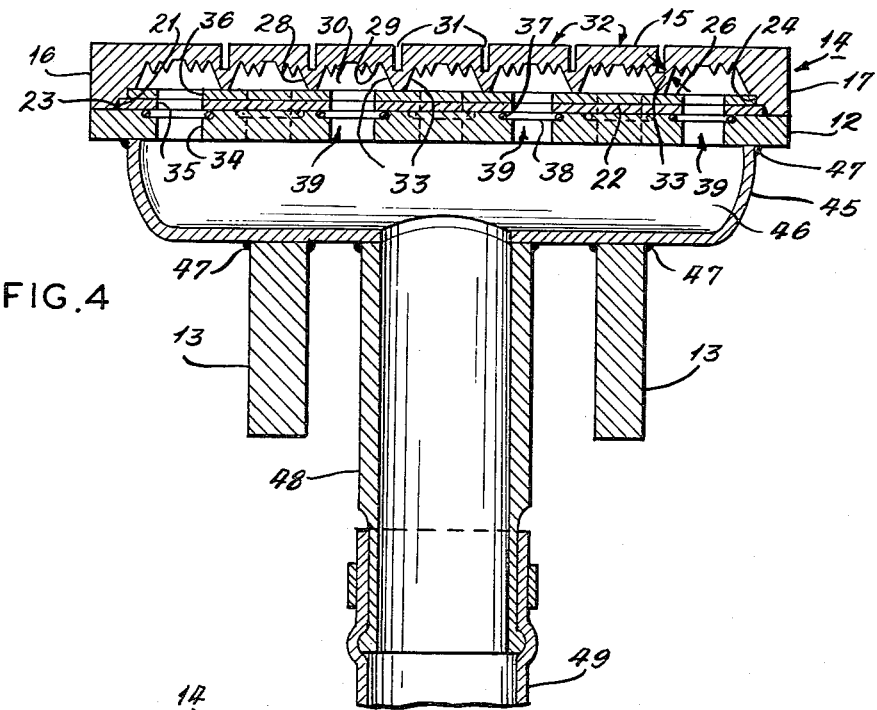
Figure 5:
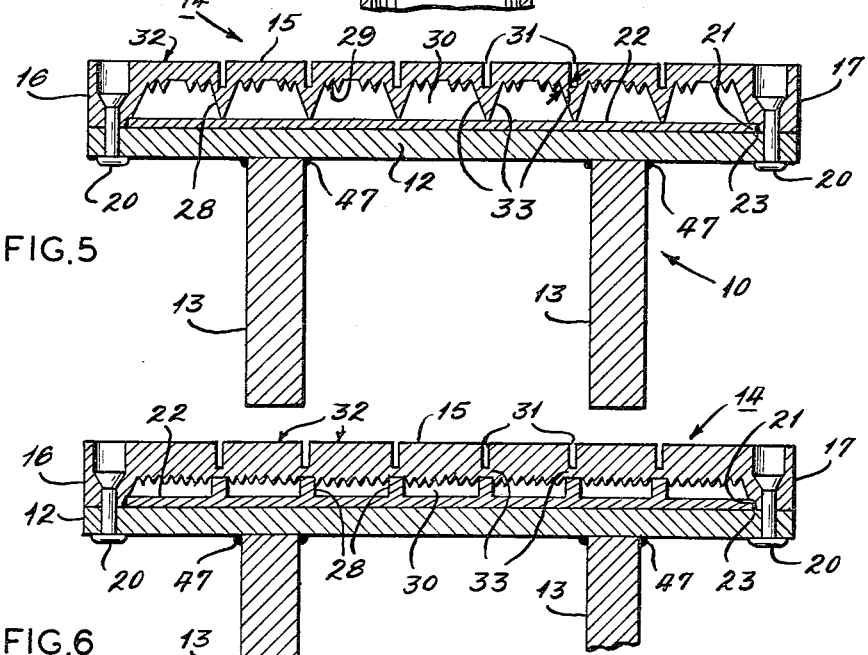
Figure 6:

The invention also consists in the parts and in the arrangements and combinations of parts hereinafter described and claimed. In the accompanying drawings which form a part of this specification and wherein like numerals refer to like parts wherever they occur:

FIG. 1 is a diagrammatic view of a brake cooling system showing a fluid cooled friction device embodying the invention, FIG. 2 is a greatly enlarged fragmentary elevational view, partly in section, showing a friction member, FIG. 3 is a cross-sectional view taken along line 3—3 of FIG. 2, FIG. 4 is a cross-sectional view taken along line 4—4 of FIG. 2, FIG. 5 is a cross-sectional view taken along line 5—5 of FIG. 2, FIG. 6 is a cross-sectional view of a modified friction member, FIG. 7 is a vertical cross-sectional view of a disc type friction device embodying the invention in a brake system shown diagrammatically, FIG. 8 is a fragmentary elevational view of the friction device taken along line 8—8 of FIG. 7, FIG. 9 is a fragmentary cross-sectional view of a modified disc type friction device, and FIG. 10 is a view similar to FIG. 9 of another form of a disc type friction device.

This application is a continuation-in-part of my copending application for Friction Device, Serial No. 774,288 filed November 17, 1958.

Briefly, the invention is embodied in a fluid cooled friction device having a friction member through which cooling fluid is circulated in heat exchange relationship with a metallic friction element attached thereto. The inner surface of the metallic friction member is supported against "dishing" or inward distortion by a plurality of supporting means and the outer or friction surface thereof is provided with groove means for absorbing permanent distortion in response to metal growth of the entire metallic friction element.

Referring now to FIGS. 1 and 7, a cooling fluid system 1 is provided with a heat exchanger 2, such as a vehicle radiator, which also serves as a reservoir for cooling fluid. The heat exchanger 2 is connected with the suction side of pumping means 3 by a conduit 4, and the discharge side of the pumping means is connected to the inlet of a friction device or brake assembly 5 or 5A by a conduit 6. To complete the cooling fluid system 1, the outlet of the friction device 5 or 5A is connected to the heat exchanger 2 by a return conduit 7. While only one friction device 5 has been shown diagrammatically, it is to be understood that more than one of the friction devices may be connected in the system 1, and that the friction devices may be actuated in any suitable manner.

The friction device 5 or 5A includes a rotatable friction member 8 or 8A secured to rotatable member, such as a vehicle wheel (not shown), and a non-rotatable supporting member 9 or 9A secured to a non-rotatable member, such as a vehicle axle flange (not shown). Referring to FIGS. 1–5, the friction device 5 also comprises opposed friction members or brake shoes 10 and 10a which are pivotally anchored at 11 on the non-rotatable or shoe supporting member 9 and are actuated into frictional engagement with the rotatable friction member 8 by conventional means (not shown). Since the opposed friction members 10 and 10a are identical in construction, only the friction member 10 is shown in detail in FIGS. 2, 3, 4 and 5 and will be described presently. As shown in FIGS. 7–10, the friction device 5A is a disc type brake device to be described more fully hereinafter.

The friction member 10 includes an arcuate platform portion or table 12 reinforced on the inner or concave side thereof by spaced webs 13 forming a carrying or base member for a metallic friction element 14. The metallic friction eleemnt 14 is preferably formed from a metal having high thermal conductive properties, such as electrolytic copper or sterling silver. Certain copper alloys, or other similar alloys, may be employed in the friction element 14, but they should have melting points of at least 1500° F. and thermal conductive properties of at least 40% of that of electrolytic copper. The friction element 14 is substantially C-shaped in cross-section having a relatively thin arcuate wall 15 with integrally formed side walls 16, 17, 18 and 19 extending inwardly therefrom, and the friction element is fixedly attached to the outer or convex surface of the table 12 by a plurality of rivets 20 which extend through the side walls of the friction element. The side walls 16, 17, 18 and 19 are recessed at 21 to receive an arcuate base plate 22 which is sealably brazed or welded thereto as shown at 23. The base plate 22 is preferably formed from the same material as the friction element 14, and the inner or concave surface thereof is normally in contact with the outer or convex surface of the table 12. The side walls 16, 17, 18 and 19 are additionally recessed at 24 and 25, FIG. 2, to receive upper and lower strengthening plates 26 and 27, which are in surface contact with the upper and lower ends, respectively, of the base plate 22.

The inner or concave surface of the arcuate wall 15 is provided with a plurality of integrally formed, spaced, ribs or supporting means 28 which extend into abutment with the base plate 22 and strengthening plates 26 and 27 and which extend longitudinally substantially the entire length of said inner surface. It is apparent that the ribs 28 could be integral with or carried by the base plate 22 and extend into abutment with the inner surface of the arcuate wall 15 as shown in FIG. 6, but in the preferred construction the ribs are integral with the arcuate wall 15. A plurality of fins 29 are also provided in the inner surface of the arcuate wall 15 between each of the ribs 28 to enhance heat transfer. In this manner a plurality of flow or circulating chambers 30 are defined between the inner surfaces of the arcuate wall 15 and base plate 22 and each of the plurality of ribs 28.

The outer or convex surface of the arcuate wall 15 is provided with a plurality of spaced longitudinal grooves 31 which extend substantially the entire length of the outer surface. The grooves 31 are formed in the arcuate wall 15 at predetermined positions in alignment with the ribs 28 or some of them, so that each groove 31 is opposite to and extends into the corresponding rib. Accordingly, the width of the arcuate wall 15 is divided into a plurality of smaller longitudinal spans 32 by the grooves 31, and the loci of weak points, shown at 33, of the wall 15 are purposely created by positioning the grooves 31 opposite to the ribs 28 so that the narrowest cross-section of the wall 15 is between the grooves and the ribs. Each of the spans 52 is proportionately stiffer in resisting buckling than the original entire width of the arcuate wall and the weakest areas of the wall 15 are located between the relatively strong spans 32 supported by the ribs 28 so that the force carrying capacity of the friction element 14 is appreciably increased.

Intense heat generated by a frictional engagement sometimes effects growth in a metallic friction element in that the particular metal will expand beyond the elastic limit thereof effecting plasticity in said metal and a resulting permanent deformation. In other words, due to metal growth, a metallic friction element will not reassume its original shape when heated enough to expand beyond the elastic limit thereof and deform plastically. In the present construction, the major portion of the deformation of the individual spans 32 due to growth from the intense heat generated upon frictional engagement will be absorbed along the loci of weak points 33 thereby while the growth or permanent distortion of metal is permitted by the grooves 31, said grooves substantially reduce or oppose the deformation tendency of the entire arcuate wall 15.

When the supporting ribs 28 are integral with or carried by the base plate 22, FIG. 6, the ribs extend into abutment with the inner surface of the arcuate wall 15. The grooves 31 in the outer surface of the arcuate wall 15 are positioned in predetermined aligned relation with the ribs 28 for strengthening purposes to oppose distortion of the arcuate wall inwardly of the chambers 30. In this embodiment, the narrowest cross-section of the arcuate wall 15 of the friction element 14 is intermediate the spans 32 and between the ribs and the inner surface of the arcuate wall. The major portion of the deformation of the individual spans 32 due to growth from the intense heat generated upon frictional engagement will be absorbed along the loci of weak points 33 whereby the grooves 31 permit said growth or permanent distortion while reducing or opposing the distortion tendency of the entire arcuate wall 15.

A plurality of aligned apertures 34, 35 and 36 are provided through the table 12, base plate 22 and upper and lower strengthening plates 26 and 27, respectively, to form a plurality of upper and lower flow passages 39 and 40 to introduce cooling fluid flow into chambers 30 and to discharge said cooling fluid flow therefrom. The apertures 34 in the table 12 are recessed at 37 to receive O rings 38 which form seals between the recesses in the table and the base plate 22. A lower plenum housing 41 having a plenum chamber 42 therein extends through the webs 13 of the friction member 10 and is positioned on the inner surface of the table 12 so that the plenum chamber communicates with the flow passages 40, the housing being secured to the table and webs by suitable means, such as a plurality of welds 43. The plenum housing 41 is also provided with a tubular fitting 44 through which cooling fluid flow may be introduced into or discharged from the plenum chamber 42. An upper plenum housing 45 having a plenum chamber 46 therein also extends through the webs 13 and is positioned in the inner surface of the table 12 so that the plenum chamber communicates with the flow passages 39, the housing being secured to the table and webs by suitable means, such as a plurality of welds 47. The upper plenum housing 45 is also provided with a tubular fitting 48 through which cooling fluid flow may be introduced into or discharged from the plenum chamber 46. In the friction device 5, FIG. 1, the plenum chambers 46 in the upper plenum housings 45 of the friction members 10 and 10a are connected by a flexible hose or conduit 49 which is attached to the tubular fittings 48 thereof. The tubular fittings 44 of the lower plenum housings 41 connect the plenum chambers 42 therein with the conduits 6 and 7, respectively, of the cooling fluid system. Thus, the corresponding cooling fluid chambers 30 of the friction members 10 and 10a are connected in series with each other, the opposite plenum chambers of the two friction members functioning respectively as inlet and outlet for the friction device 5.

In the operation of the embodiments shown in FIGS. 1–6, pumping means 3 normally circulates cooling fluid from the heat exchanger 2 through the conduits 4 and 6 into the tubular fitting 44 and lower plenum chamber 42 of the friction member 10. The cooling fluid then flows through the lower flow passages 40, the plurality of circulating chambers 30, and the upper flow passages 39 into the upper plenum chamber 46 and tubular fitting 48 of the friction member 10. The cooling fluid is further circulated through the conduit 49 into the tubular fitting 48 and upper plenum chamber 46 of the friction member 10a. Therefrom, the cooling fluid flows through the upper flow passages 39, the plurality of circulating chambers 30, and the lower flow passages 40, into the lower plenum chamber 42 and tubular fitting 44 of the friction member 10a. The cooling fluid is discharged from the friction member 10a back to the heat exchanger 2 for cooling purposes through the return conduit 7.

As stated, any conventional means can be employed to create an applying force for moving the friction members 10 and 10a of friction device 5 from retracted positions into frictional braking engagement with the friction drum 8. When the outer surface of the arcuate wall 15 of the friction element 14 is moved into frictional engagement with the friction drum 8, a force is created on said arcuate wall in opposition to the applied force and the intense heat generated during this frictional engagement is conducted through the relatively thin friction element 14, the ribs 28 and fins 29 thereof to the cooling fluid circulating through the circulating chambers 30.

The ribs 28 support the friction element 14 in spaced relation with the base plate 22 to oppose the force of frictional engagement in order to prevent "dishing" or permanent inward distortion or collapse of said friction element. In addition, the supported spans 32 between the spaced grooves 31 in the friction element 14 serve to proportionally strengthen or stiffen the arcuate wall 15 to oppose the abovementioned force thereon.

When the heat generated during this frictional engagement becomes intense enough to cause the metal of the friction element 14 to expand beyond the particular elastic limits thereof, the individual spans 32 are permanently deformed. However, the grooves 31 and the loci of weak points 33 allow the metal of the friction element 14 to grow or deform permanently in a manner that the aggregate outer surface of the arcuate wall 15 of the friction member 14 is maintained substantially symmetrical and smooth for frictional engagement with the friction drum 8.

Upon completion of braking, the friction members 10 and 10a are returned to the retracted positions thereof, and the residual heat of the terminated frictional engagement is transferred to the cooling fluid circulating through the system 1.

Referring now to FIGS. 7–10, a disc type friction device 5A includes the non-rotatable supporting member or annular housing 9A for attachment with a non-rotatable member, such as a vehicle axle flange (not shown) and the rotatable member or disc 8A for attachment with a rotatable member, such as a vehicle wheel (not shown), a non-metallic friction material or lining 50 being carried on the disc in a position to be frictionally engaged by a friction member or piston 51.

The housing 9A has an annular bore 52 in which an annular seal 53 is positioned in sealing engagement with the side walls thereof and in abutment with an annular plunger 54 of the friction member 51 slidably positioned in the bore 52. An actuating port 55 is provided through the end-wall of the bore 52 for connection with pressure generating means (not shown) for friction device energization purposes. The friction member 51 also includes an enlarged annular channel member 56 which is C-shaped in cross-section and integrally formed on the other end of the plunger 54, the channel member being slidable in the housing 9A. The open end of the C-shaped channel member 56 is closed by a relatively thin, annular, metallic friction element or plate 57, which is secured thereto by suitable means, such as a plurality of rivets 58. The friction element 57 is similar to the friction element 14 in FIGS. 1–5 described hereinbefore.

An annular flow or circulating chamber 59 is defined between the C-shaped channel member 56 and the friction element 57 having inlet and outlet ports 60 and 61 diametrally positioned therefor. The inlet port 60 slidably and sealably receives one end of an inlet conduit 62, the other end thereof being attached to the conduit 6 connected to the pressure side of pumping means 3. An outlet conduit 63 has one end slidably and sealably received in the outlet port 61 and its other end is connected by conduit 7 to the heat exchanger or radiator 2 of the cooling system 1. Accordingly, the pumping means 3 continuously flows cooling fluid through the circulating chamber 59 in the channel member 56 at a fluid pressure great enough to overcome the resistances of the system. The channel member 56 is also provided with a plurality of anchor pin receiving bores 64 to slidably receive anchor pins 65 fixed in the housing 9A. It is apparent that the annular friction member 51 is movable axially in response to fluid pressure generated in the housing bore 52 to frictionally engage the metallic friction element 57 with the friction material 50 on the disc 8A to effect braking or deceleration of the vehicle and that rotation of the friction member relative to the housing 9A during braking is prevented by the anchor pins 65.

The intense heat generated by a frictional engagement sometimes effects permanent radial growth in an annular metallic friction element whereby the particular metal will expand in a radial direction beyond the elastic limits thereof and effect plasticity which results in a permanent deformation. In other words, a metallic friction element will not re-assume its original shape when heated enough to expand beyond the elastic limits thereof and deform plastically. In a disc type friction device, the friction element or wall 57 is secured to the piston member side walls or flanges 66 by the rivets 58, and annular seals 67 are provided between the flanges and the friction wall to prevent loss of cooling fluid. However, a major problem is created when radial growth of the friction wall causes buckling or distortion thereof inasmuch as the seals become ineffective and leakage results. In addition, the friction element develops non-uniform frictional engagement characteristics producing excessive wear and localized overheating.

The annular metallic friction element 57 is provided with an annular outer surface 68 for frictional engagement with the friction material 50 of the disc 8A and an annular inner surface 69 in direct heat transfer relationship with the cooling fluid continuously circulated through the chamber 59 of the channel member 56 by the pumping means 3. The inner surface 69 of the friction element 57 is preferably provided with a plurality of spaced support members or rivets 70 to support the friction element 57 against "dishing" or distortion inwardly of the chamber 59 due to the force applied on the friction element during frictional engagement. Each of the rivets 70 has one end attached to the inner surface 69 by suitable means, such as staking, and the other end thereof extends into abutment with the base wall of the channel member 56. A plurality of concentric fins 71 are also provided on the inner surface 69 to enhance heat transfer to the cooling fluid circulated through the chamber 59.

The outer surface 68 of the friction element 57 is provided with annular grooves 72 positioned adjacent the peripheral edges thereof and in an aligned relation opposite to the side walls of the channel member 56 and adjacent to the seals 67 for preventing axial distortion of the friction element. The grooves 72 divide the friction element 57 into smaller annular spans 73 which are proportionally stiffer than the entire element to resist inward distortion due to the frictional engagement, and also allow for radial expansion and growth of the metal due to the intense heat. The narrowest cross-section of the friction element 57 is between the spans 73 and between the inner surface 69 and the side walls 66 of the channel member 56. As a result, a loci of weak points, shown at 74, are located between the grooves 72 and the inner surface 69 and the major portion of the deformation of the individual spans 73 due to growth from the intense heat of frictional engagement will be adbsorbed along the loci of weak points to substantially reduce or oppose the distortion tendency of the entire friction element 57.

Referring now to FIG. 9, it will be seen that the friction element 57 may also have spaced annular ribs or supporting means 75 formed integral therewith and extending from the inner surface 69 into abutment with the base wall of the channel member 56. A plurality of cooling fins 71 are also formed on the inner surface 69 for more rapid heat dissipation to the cooling fluid in the chamber 59.

The outer surface 68 of the annular friction element 57 includes at least one annular groove 72 and preferably a plurality of them in spaced concentric relation. The width of the outer surface 68 is divided by the grooves into a plurality of smaller concentric spans 73, and the grooves 72 are located in aligned relation opposite to the ribs 75 to extend into corresponding ribs and permit radial growth or distortion of the individual spans 73 to absorb distortion of the entire friction element 57 due to heat. Also, each of the smaller spans 73 is proportionally stiffer in resisting buckling than is the entire friction element 57.

When supporting ribs 75 are integral with or carried by the base wall of the channel member 56 as shown in FIG. 10, the ribs extend into abutment with the inner surface 69 of friction element 57 and function in the same manner as the ribs shown in FIG. 9. The grooves 72 in the outer surface of the friction element 57 are also positioned in alignment with these ribs so that the narrowest cross-section of the friction element 57 is intermediate the spans 73 and between the ribs 75 and the inner surface 69 of said friction element whereby deformation of the individual spans 73 due to growth from the intense heat generated upon frictional engagement will be absorbed along the loci of weak points 74 to reduce or oppose the distortion tendency of the entire friction element 57.

In the operation, pumping means 3 normally circulates cooling fluid from the heat exchanger 2 through the conduit 6 and the inlet port 60 of the friction member 51 into the circulating chamber 59. The cooling fluid then flows through the circulating chamber 59 to the outlet port 61 of the friction member 51 and therefrom is returned through the conduit 7 to the heat exchanger 2 for cooling purposes.

Although not shown, any conventional pressure generating means can be connected to the actuating port 55 of the housing 9A and can be employed to create a fluid pressure in the housing bore 52. This fluid pressure acts on the effective area of the seal 53 to create an applying force for moving the friction member 51 into frictional engagement with the friction lining 50 carried on the disc 8A for deceleration and/or stopping purposes. When the outer surface 68 of the friction element 57 is moved into frictional engagement with the friction lining 50, a force is created on the friction element in opposition to the applied force and the intense heat generated during this frictional engagement is conducted through the relatively thin friction element 57, the support means 70, 75 and fins 71 to the cooling fluid continuously flowing through the circulating chamber 59.

The abutting engagement of the support means 70, 75 and the base wall of the channel member 56 serves to oppose the force of frictional engagement in order to prevent inward distortion or collapse of the friction element. In addition, the spans 73 between the spaced grooves 72 formed in the outer surface 68 of the friction element 57 serve to proportionally strengthen or stiffen the friction element to further support the element against axial distortion.

When the heat generated by this frictional engagement becomes intense enough to cause the metal of the friction element 57 to expand beyond the particular elastic limits thereof and effect plasticity, the individual spans 73 are permanently deformed. However, the loci of weak points 74 are predetermined to allow the metal of the friction element 57 to grow or deformed permanently so that permanent distortion of the circumferential extremities of the friction element 57 is substantially obviated and so that the aggregate outer surface 68 of the fraction element 57 is maintained substantially smooth and planar for frictional engagement with the friction lining 50.

Upon completion of braking, the fluid pressure in the housing bore 52 is alleviated thereby removing the force tending to frictionally engage the friction member 57 from the lining 50 on the disc 8A so that the friction member is returned to its original position or return said friction member to a position where drag therebetween is negligible. The resultant heat of the terminated frictional engagement is transferred to the cooling fluid circulating through the chamber 59.

From the foregoing, it is apparent that a fluid cooled friction device 5 or 5A is provided with a relatively thin, annular, metallic, friction element 14, 57 having means to absorb, yet permit permanent distortion due to growth from intense heat created by frictional engagement. The abutting engagement of the support means between the base wall and the friction element opposes the force on the friction element due to frictional engagement and prevents permanent inward distortion or collapse of the friction element to keep the circulating chambers 46, 59 open and the contact surface of the element substantially even. The friction element is divided into relatively strong spans 32, 73 and predetermined weak points aligned with the support means so that growth or permanent distortion of the relatively thin metallic friction element will be absorbed by the shifting of the spans along the weak points. Accordingly, the aggregate outer surface 122 of the friction element is maintained substantially symmetrical or planar for effective frictional engagement with the cooperating rotatable friction member 8A, and seals are maintained in effective sealing relation.

It is now apparent that there has been provided an improved friction device which fulfills all the objects and advantages sought therefor. It is to be understood, however, that the foregoing description and accompanying drawings have been presented only by way of illustration and example, and changes and alterations in the instant disclosure, which will be apparent to one skilled in the art, are contemplated as within the scope of the instant invention which is limited only by the claims that follow.

What I claim is:

1. An annular friction element for a fluid cooled friction device comprising a relatively thin metallic wall, radially spaced annular marginal edges defining the circumferential extremities of said wall, opposed annular friction and cooling surfaces on said wall intermediate said edges, said friction surface having a predetermined symmetry, supporting means for supporting said wall against distortion inward of said friction surface, and groove means radially spaced between said edges in said friction surface and aligned with said supporting means dividing said wall into annular supported spans, said groove means absorbing permanent radial distortion in response to metal growth characteristics of said wall effected by cyclical thermal differentials between said friction and cooling surfaces to substantially maintain the predetermined symmetry of said friction surface.

2. An annular friction element for a fluid cooled friction device comprising a relatively thin metallic wall, spaced annular marginal edges defining the circumferential extremities of said wall, a planar annular friction surface on said wall adapted for frictional engagement, an annular cooling surface on said wall opposite said friction surface for heat exchange relation with cooling fluid, radially spaced annular groove means in said friction surface and between said marginal edges, and an annular locus of weak points intermediate the base of said groove means and said cooling surface, said groove means absorbing permanent radial distortion of said wall in response to metal growth characteristics effected by cyclical thermal differentials between said friction and cooling surfaces and said locus of weak points absorbing permanent axial distortion of said wall to maintain said friction surface substantially planar.

3. A metallic friction member for use in a fluid cooled friction device comprising an annular base wall interconnecting axially extending side walls, a metallic friction element having inner and outer circumferential edges secured to said side walls and in combination with said member forming a chamber for cooling fluid, means for circulating cooling fluid through said chamber, a cooling surface on said element adapted for heat exchange relation with cooling fluid in said chamber, a friction surface on said element opposite said cooling surface and adapted for frictional engagement, sealing means between said element and member adjacent said inner and outer edges, respectively, and groove means in said friction surface and radially spaced from said circumferential edges to substantially obviate relative movement of said element and member away from said sealing means in response to metallic growth characteristics effected by cyclical thermal differentials of frictional engagement.

4. An annular friction element for a fluid cooled friction device comprising a metallic wall having growth characteristics effected by cyclical thermal differentials of frictional engagement, said wall having radially spaced annular marginal edge surfaces interconnected by opposed axially spaced friction and cooling surfaces for frictional engagement and for heat exchange relationship with cooling fluid, respectively, and radially spaced annular groove means in said friction surface intermediate said marginal edge surfaces to accommodate permanent distortion of said wall in a radial direction in response to the metal growth characteristics effected by cyclical thermal differentials between said friction and cooling surfaces of said wall and to substantially prevent permanent distortion of said marginal edge surfaces of said wall.

5. The element according to claim 4 wherein said groove means are adjacent to and spaced from said marginal edge surfaces, said wall between said groove means being a heat conducting portion, and said wall between said groove means and said marginal edge surfaces being mounting portions of said element whereby said groove means prevent said heat conducting portion of said wall from effecting permanent distortion of said mounting portions.

6. An annular friction member of use in a fluid cooled friction device, said member including an annular channel for cooling fluid, an annular metallic friction element forming one wall of said channel and being secured to said member adjacent to its circumferential edges, said element having a friction surface for frictional engagement, the combination which comprises annular groove means formed in said friction surface to substantially obviate radial movement of the circumferential edges of said element relative to said member in response to metallic growth characteristics of said element effected by cylical thermal differentials in the element due to multiple frictional engagements.

7. An annular friction member for use in a fluid cooled friction device, said member including an annular chamber for cooling fluid, an an annular metallic friction element forming one wall of said chamber and having radially spaced inner and outer circumferential edges secured to said member, opposed annular friction and cooling surfaces formed on said element between said edges for frictional engagement and for heat transfer relation with cooling fluid in the chamber, respectively, the combination which comprises an annular groove formed in said friction surface adjacent to each of said edges to absorb permanent radial distortion of the portion of said element between said grooves in response to metal growth characteristics effected by cyclical thermal differentials in the element due to multiple frictional engagements and to substantially obviate radial movement of the circumferential edges of the element relative to said member.

8. A fluid cooled friction device comprising a pair of relatively rotatable annular members movable into frictional engagement, a friction material on one of said members, an annular chamber for cooling fluid in the other of said members, an annular metallic friction element secured to the other of said members adjacent to the respective inner and outer circumferential extremities thereof and forming one wall of said chamber, means for circulating cooling fluid through said chamber, sealing means adjacent to the respective inner and outer circumferential extremities of said friction element and the other member to prevent leakage of cooling fluid from said chamber, a friction surface on said element adapted for heat generating frictional engagement with the friction material on said one member, a cooling surface opposite said friction surface adapted for heat exchange relation with cooling fluid in said chamber, and annular groove means in said friction surface and radially spaced between the inner and outer circumferential extremities of said element to absorb permanent distortion of said element and substantially obviate relative movement of said element and the other of said members in response to metal growth characteristics of said element effected by cyclical thermal differentials of frictional engagement between said element and the friction material on said one member.

9. A fluid cooled annular friction device comprising a pair of relatively rotatable annular members movable into frictional engagement, an annular chamber for cooling fluid in one of said members, an annular friction element having inner and outer circumferential extremities secured to said one member, opposed annular friction and cooling surfaces on said element between the inner and outer circumferential extremities thereof for frictional engagement with the other of said members and for heat exchange relation with the cooling fluid in said chamber, respectively, an annular seal between said one member and said friction element adjacent to one of the circumferential extremities thereof, and an annular groove in said friction surface adjacent to said seal for absorbing permanent radially inward distortion of said friction element due to metal growth to maintain said friction element in sealing engagement with said seal.

References Cited in the file of this patent
UNITED STATES PATENTS

| | | |
|---|---|---|
| 1,131,810 | Zoller et al. | Mar. 16, 1915 |
| 1,536,558 | Bukowsky | May 5, 1925 |
| 2,664,176 | Whalen | Dec. 29, 1953 |
| 2,747,702 | Van Zelm | May 29, 1956 |
| 2,821,271 | Sanford | Jan. 28, 1958 |
| 2,821,273 | Sanford et al. | Jan. 28, 1958 |
| 2,880,823 | Sedergren | Apr. 7, 1959 |
| 2,964,136 | Schnell | Dec. 13, 1960 |